US007121942B2

(12) United States Patent
Baerlocher

(10) Patent No.: US 7,121,942 B2
(45) Date of Patent: Oct. 17, 2006

(54) GAMING DEVICE INCLUDING A GAME HAVING A PLAYER SELECTED FUNCTION BASED ON SYMBOLS IN A FREE SPINS GAME

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 600 days.

(21) Appl. No.: 10/243,052

(22) Filed: Sep. 12, 2002

(65) Prior Publication Data

US 2004/0053672 A1 Mar. 18, 2004

(51) Int. Cl.
*A63F 13/00* (2006.01)

(52) U.S. Cl. ........................................................ 463/20

(58) Field of Classification Search .................. 463/16, 463/20; 273/143 R, 138.1, 139

See application file for complete search history.

(56) References Cited

U.S. PATENT DOCUMENTS 4,695,053 A 9/1987 Vazquez, Jr. et al.
5,209,479 A 5/1993 Nagao et al.
5,393,057 A 2/1995 Marnell, II
5,407,200 A 4/1995 Zalabak
5,423,539 A 6/1995 Nagao
5,449,173 A 9/1995 Thomas et al.
5,456,465 A 10/1995 Durham
5,560,603 A 10/1996 Seelig et al.
5,647,798 A 7/1997 Falciglia
5,722,891 A 3/1998 Inoue
5,732,948 A 3/1998 Yoseloff
5,772,506 A 6/1998 Marks et al.
5,775,692 A 7/1998 Watts et al.
5,823,874 A 10/1998 Adams
5,833,537 A 11/1998 Barrie
5,848,932 A 12/1998 Adams
5,855,514 A 1/1999 Kamille
5,918,880 A 7/1999 Voigt, IV et al.
5,919,088 A 7/1999 Weiss
5,935,002 A 8/1999 Falciglia (Continued)

FOREIGN PATENT DOCUMENTS

AU 199716432 B2 9/1997

(Continued)

OTHER PUBLICATIONS

American Thunder Screen Shots written by IGT, published in 1998.

(Continued)

*Primary Examiner*—Kim Nguyen
(74) *Attorney, Agent, or Firm*—Bell, Boyd & Lloyd LLC

(57) ABSTRACT

A gaming device including a free spins game displaying a plurality of reels including a plurality of symbols where the symbols include a plurality of award symbols and at least one target symbol. A plurality of selections including at least one game function are displayed to a player. In a game, the gaming device provides the player with a plurality of free spins of the reels. In each free spin, the gaming device provides the player with an award or awards for any award symbols or combinations of award symbols indicated on the reels. In addition, the gaming device provides the player with one or more picks of the selections for each target symbol indicated on the reels. The gaming device then determines the game function or game functions associated with the picked selections in each free spin. A total award based on the awards and game functions is provided to the player.

46 Claims, 14 Drawing Sheets

U.S. PATENT DOCUMENTS

| | | | |
|---|---|---|---|
| 5,964,463 | A | 10/1999 | Moore, Jr. |
| 5,971,849 | A | 10/1999 | Falciglia |
| 5,980,384 | A | 11/1999 | Barrie |
| 5,988,638 | A | 11/1999 | Rodesch et al. |
| 5,997,401 | A | 12/1999 | Crawford |
| 6,003,867 | A | 12/1999 | Rodesch et al. |
| 6,004,207 | A | 12/1999 | Wilson, Jr. et al. |
| 6,012,982 | A | 1/2000 | Piechowiak et al. |
| 6,015,346 | A | 1/2000 | Bennett |
| 6,059,289 | A | 5/2000 | Vancura |
| 6,089,976 | A | 7/2000 | Schneider et al. |
| 6,089,978 | A | 7/2000 | Adams |
| 6,102,400 | A | 8/2000 | Scott et al. |
| 6,102,798 | A | 8/2000 | Bennett |
| 6,120,031 | A | 9/2000 | Adams |
| 6,126,542 | A | 10/2000 | Fier |
| 6,135,885 | A | 10/2000 | Lermusiaux |
| 6,149,521 | A | 11/2000 | Sanduski |
| 6,159,097 | A | 12/2000 | Gura |
| 6,159,098 | A | 12/2000 | Slomiany et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,429 | B1 | 3/2001 | Demar et al. |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,231,442 | B1 | 5/2001 | Mayeroff |
| 6,234,897 | B1 | 5/2001 | Frohm et al. |
| 6,238,288 | B1 | 5/2001 | Walker et al. |
| 6,251,013 | B1 | 6/2001 | Bennett |
| 6,261,177 | B1 | 7/2001 | Bennett |
| 6,270,409 | B1 | 8/2001 | Shuster |
| 6,270,411 | B1 | 8/2001 | Gura et al. |
| 6,305,686 | B1 | 10/2001 | Perrie et al. |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,319,124 | B1 | 11/2001 | Baerlocher et al. |
| 6,322,309 | B1 | 11/2001 | Thomas et al. |
| 6,328,649 | B1 | 12/2001 | Randall et al. |
| 6,334,814 | B1 | 1/2002 | Adams |
| 6,336,863 | B1 | 1/2002 | Baerlocher et al. |
| 6,340,158 | B1 | 1/2002 | Preice et al. |
| 6,346,043 | B1 | 2/2002 | Colin et al. |
| 6,347,996 | B1 | 2/2002 | Gilmore et al. |
| 6,364,767 | B1 | 4/2002 | Brossard et al. |
| 6,364,768 | B1 | 4/2002 | Acres et al. |
| 6,375,570 | B1 | 4/2002 | Poole |
| 6,394,902 | B1 | 5/2002 | Glavich et al. |
| 6,398,218 | B1 | 6/2002 | Vancura |
| 6,398,644 | B1 | 6/2002 | Perrie et al. |
| 6,406,369 | B1 | 6/2002 | Baerlocher et al. |
| 6,416,408 | B1 | 7/2002 | Tracy et al. |
| 6,419,579 | B1 | 7/2002 | Bennett |
| 6,439,993 | B1 | 8/2002 | O'Halloran |
| 6,443,452 | B1 | 9/2002 | Brune |
| 6,454,651 | B1 | 9/2002 | Yoseloff |
| 6,471,208 | B1 | 10/2002 | Yoseloff et al. |
| 6,481,713 | B1 | 11/2002 | Perrie et al. |
| 6,491,584 | B1 | 12/2002 | Graham et al. |
| 6,494,454 | B1 | 12/2002 | Adams |
| 6,537,150 | B1 | 3/2003 | Luciano et al. |
| 6,537,152 | B1 | 3/2003 | Seelig et al. |
| 6,561,904 | B1 | 5/2003 | Locke et al. |
| 6,565,436 | B1 | 5/2003 | Baerlocher |
| 6,602,137 | B1 | 8/2003 | Kaminkow et al. |
| 6,604,740 | B1 | 8/2003 | Singer et al. |
| 6,712,694 | B1 | 3/2004 | Nordman |
| 6,719,630 | B1 | 4/2004 | Seelig et al. |
| 6,733,389 | B1 | 5/2004 | Webb et al. |
| 6,805,349 | B1 | 10/2004 | Baerlocher et al. |
| 6,869,360 | B1 | 3/2005 | Marks et al. |
| 6,905,406 | B1 | 6/2005 | Kaminkow et al. |
| 6,913,532 | B1 | 7/2005 | Baerlocher et al. |
| 6,921,335 | B1 | 7/2005 | Rodgers et al. |
| 6,955,600 | B1 | 10/2005 | Glavich et al. |
| 2001/0009865 | A1 | 7/2001 | Demar et al. |
| 2002/0010017 | A1 | 1/2002 | Bennett |
| 2003/0013519 | A1 | 1/2003 | Bennett |
| 2003/0054875 | A1 | 3/2003 | Marks et al. |
| 2003/0060272 | A1 | 3/2003 | Glavich et al. |
| 2003/0073483 | A1 | 4/2003 | Glavich et al. |
| 2003/0162585 | A1 | 8/2003 | Bigelow et al. |
| 2003/0203753 | A1 | 10/2003 | Muir et al. |
| 2003/0211879 | A1* | 11/2003 | Englman ..................... 463/20 |
| 2004/0002372 | A1 | 1/2004 | Rodgers et al. |
| 2004/0038731 | A1* | 2/2004 | Englman ..................... 463/25 |
| 2004/0053666 | A1 | 3/2004 | Vancura |
| 2004/0053669 | A1 | 3/2004 | Gerrard et al. |
| 2004/0053672 | A1 | 3/2004 | Baerlocher |
| 2004/0072612 | A1 | 4/2004 | Rodgers et al. |
| 2004/0137982 | A1 | 7/2004 | Cuddy et al. |
| 2004/0147306 | A1 | 7/2004 | Randall et al. |
| 2005/0049035 | A1 | 3/2005 | Baerlocher et al. |
| 2005/0070354 | A1 | 3/2005 | Baerlocher et al. |
| 2005/0233801 | A1 | 10/2005 | Baerlocher |
| 2005/0266917 | A1 | 12/2005 | Glavich et al. |

FOREIGN PATENT DOCUMENTS

| | | | |
|---|---|---|---|
| AU | A-50327/96 | | 10/1997 |
| AU | 199748484 | | 7/1998 |
| AU | A-63553/98 | | 10/1998 |
| EP | 0798676 | A1 | 10/1997 |
| EP | 0874337 | A1 | 10/1998 |
| EP | 0944030 | A2 | 3/1999 |
| EP | 0926645 | A2 | 6/1999 |
| EP | 0 981 119 | A2 | 2/2000 |
| EP | 0984409 | A2 | 3/2000 |
| GB | 2 322 217 | A | 8/1998 |
| GB | 2328311 | A | 2/1999 |
| GB | 2406697 | | 3/2004 |
| WO | WO 0012186 | | 3/2000 |
| WO | WO 00/32286 | | 6/2000 |
| WO | WO 01/26019 | A1 | 4/2001 |
| WO | WO03075235 | | 9/2003 |
| WO | WO 2004/025584 | A2 | 3/2004 |

OTHER PUBLICATIONS

Bally Slot Machines Electro-Mechanicals 1964-1980 Book [In Part], Revised 3rd Edition written by Marshall Fey.
Bonus Times Article written by Bally Gaming, published in 2000.
Field Testing New Slots Article, written by Strictly Slots, published in Jul. 2000.
Good Times Advertisement written by International Game Technology, published in 1999.
Leopard Spots™ (website) written by www.igt.com, printed Mar. 21, 2001.
Mega Multiplier® (website) written by www.wmsgaming.com, printed May 22, 2001.
Polly & Roger Brochure written by VLC, Inc, published in 2000.
Super Cherry Advertisement written by International Game Technology, published in 2001.
Take Your Pick Article, Strictly Slots, published Mar. 2001.
Top Cat Brochure written by WMS Gaming, Inc., published date not known.

Treasure Tunnel, Treasure Wheel Brochure written by Sigma Game, Inc., published date unknown.
X Factor Brochure and Website Page written by WMS Gaming, Inc., published in 1998.
Yahtzee Video Game Advertisement, written by Mikohn Winning Solutions Worldwide, published 1999.
Catch A Wave Advertisement written by IGT, published in Dec. 2000.
Dolphin Treasure Advertisement written by Aristocrat Leisure Industries Pty., Ltd., published in 1996.
Spin Til You Win Game Description written by IGT, published in 1996.

* cited by examiner

GAMING DEVICE INCLUDING A GAME HAVING A PLAYER SELECTED FUNCTION BASED ON SYMBOLS IN A FREE SPINS GAME

CROSS REFERENCE TO RELATED APPLICATIONS

This application relates to the following commonly owned applications: "GAMING DEVICE HAVING A RE-TRIGGER SYMBOL BONUS SCHEME," Ser. No. 09/981,133, now U.S. Pat. No. 6,913,532; "GAMING DEVICE HAVING REGENERATING MULTIPLE AWARD OPPORTUNITIES," Ser. No. 09/960,784, "GAMING DEVICE HAVING FREE GAMES BONUS WITH A CHANGING MULTIPLIER," Ser. No. 10/086,146, 'GAMING DEVICE HAVING A BONUS GAME WITH MULTIPLE PLAYER SELECTABLE AWARD OPPORTUNITIES," Ser. No. 10/237,207, "GAMING DEVICE HAVING A RE-TRIGGERING SYMBOL BONUS SCHEME WITH A BONUS SYMBOL ACCUMULATOR," Ser. No. 10/071,441, "GAMING DEVICE HAVING A PROBABILITY ENHANCING TRIGGER SYMBOL," Ser. No. 10/241,255, "GAMING DEVICE INCLUDING A GAME HAVING A WILD SYMBOL RELATED AWARD," Ser. No. 10/633,391, "GAMING DEVICE HAVING A PROBABILITY-ENHANCING TRIGGER SYMBOL," Ser. No. 10/661,443, "GAMING DEVICE HAVING A BONUS GAME WITH MULTIPLE PLAYER SELECTABLE AWARD OPPORTUNITIES," Ser. No. 10/660,076, "GAMING DEVICE HAVING A FREE SPIN GAME," Ser. No. 10/953,812, "GAMING DEVICE HAVING SEQUENTIAL ACTIVATIONS OF A GAME AND REPLAY OF PREVIOUS ACTIVATIONS OF THE GAME," Ser. No. 10/956,508, "GAMING DEVICE WITH CHANGING WILD SYMBOLS," Ser. No. 10/956,303, "GAMING DEVICE HAVING FREE SPIN MODE WITH SYMBOL ELIMINATION," Ser. No. 10/953,818, "GAMING DEVICE HAVING A RE-TRIGGERING SYMBOL BONUS SCHEME WITH A BONUS SYMBOL ACCUMULATOR AND PLAYER SELECTION OF ACCUMULATION TOTAL," Ser. No. 10/952,656, and "GAMING DEVICE HAVING A RE-TRIGGER SYMBOL BONUS SCHEME," Ser. No. 11/156,112.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming machine manufacturers constantly strive to make gaming machines that maximize enjoyment and excitement for players. Providing a bonus or secondary game in which a player has an opportunity to win potentially large awards or credits in addition to the awards associated with the base or primary game of the gaming machine is one way to enhance player enjoyment and excitement.

Known gaming devices having bonus games employ a triggering event that occurs during play of the base game of the gaming device. The triggering event temporarily stalls or halts the base game play and enables a player to enter a second, different game, which is the bonus game. The player plays the bonus game, likely receives an award, and returns to the base game.

Bonus games that provide players with large awards or the potential to win large awards are especially attractive to players. One way that gaming device manufacturers provide larger or more frequently occurring awards in slot gaming machines is by providing free spins to a player. Several known games provide players a number such as one or more free spins at the beginning of the game and spin the reels to obtain awards. This type of bonus game is described in European Patent Application No. EP 0874337A1 and European Patent No. EP 0984409A2. These games are generally versions of a "Spin Until" type bonus game.

EP 0874337A1 discloses a gaming device having a bonus game where the player spins a plurality of reels including several symbols. In the bonus game, if the player obtains a winning symbol combination on the reels, the player receives an award and spins again. The probability for obtaining a winning symbol combination on the reels is greater than fifty percent. Therefore, a player will likely have multiple opportunities to spin the reels in the bonus game and to receive several awards. If the player does not obtain a winning symbol combination, the bonus game ends and the player receives the total accumulated awards for the bonus game. Thus, the player spins the reels in the bonus game until they do not obtain a winning combination.

EP 0984409A2 discloses a gaming device wherein the game enables the player to spin a plurality of reels having various symbols attempting to obtain awards. In this bonus game, the player starts the bonus game with a limited number of spins. The player spins the reels until there are no spins remaining. The player receives an award after each spin. The final award in the bonus game is the total of all of the awards accumulated by the player in the game.

Another way that gaming device manufacturers provide larger awards to players is by using multipliers. A multiplier increases the award amount proportionally to the value of the multiplier. For example, a "2×" multiplier pays twice the normal award value. A "3×" multiplier pays three times the normal award value. A multiplier can substantially increase a player's award. Some games also employ an incrementing multiplier as described in the following paragraphs.

U.S. Pat. No. 6,004,207 discloses a slot machine that provides a multiplied payout when certain symbols or symbol combinations appear on the reels and a player bets the maximum amount of coins. This bonus game includes a plurality of reels including several symbols on the reels and a multiplier. The symbols include multiplier symbols and Power Point symbols. Initially, the bonus game sets the multiplier at a predetermined level. The multiplier increments by one level when the player obtains ten Power Point symbols on the reels from one or more spins. After the multiplier increases in value, the player needs ten more Power Point symbols to increment the multiplier again. The gaming device also enables a player to spin the reels to obtain a winning symbol combination. If the player obtains a winning combination, the gaming device provides the player with an award. If the winning combination includes a multiplier symbol, the award is multiplied by the multiplier. Once an award is multiplied by the multiplier, the multiplier resets to a predetermined level.

Another type of bonus game disclosed in U.S. Pat. No. 6,328,649 B1 (known as "GOOD TIMES®" gaming device) that includes a multiplied payout is manufactured by the assignee of this patent application. This game includes three reels having a plurality of symbols and blank spaces. The symbols include a plurality of "GOOD TIMES®" symbols. The bonus includes two different multiplier groups. A first multiplier group starts at "1×" (or one times the award) and goes up to "12×" (or twelve times the award). The second multiplier group starts at "1×" and goes up to "144×" (or one hundred forty-four times the award). Each time a player spins the reels and obtains three blank spaces on a payline, the designated multiplier in each multiplier increments one level. When the player obtains a winning combination, the player receives an award. If a "GOOD TIMES®" symbol appears in the winning combination, the player's award is multiplied by the designated multiplier in the first bonus table. If two "Good Times®" symbols appear in the winning combination, the player's award is multiplied by the designated multiplier in the second bonus group.

It should be appreciated that multipliers may substantially elevate award returns and increase player excitement and enjoyment. Players enjoy playing for high bonus awards. Thus, it is desirable to have a bonus game of a gaming device that provides several opportunities to play a bonus game and has the potential to accumulate large awards.

SUMMARY OF THE INVENTION

The present invention provides a gaming device including a free spins game displaying a plurality of reels to a player. The reels may be mechanical or video reels and include several symbols. The symbols include a plurality of award symbols and at least one target symbol. A plurality of awards are associated with the award symbols such that the gaming device provides the award or awards associated with any indicated award symbols on the reels in each spin of the reels. Additionally, the gaming device displays several selections which include one or more game functions such as modifiers. The game functions or modifiers may be multipliers, positive values, negative values, null or zero values or any other suitable modifiers. A spins remaining display indicates the number of spins remaining in a game. A modifier display such as a multiplier display indicates the value of any modifiers or multipliers obtained in the activations of the game. A total award display indicates the total award accumulated by a player in a game.

In one embodiment, the gaming device provides one or more free spins of the reels to the player. The number of free spins may be randomly determined, predetermined, determined by a wager made by a player or according to any suitable method. In each spin, the gaming device determines the award, if any, associated with any indicated award symbols on the reels. When one or more target symbols are indicated on the reels, the gaming device enables the player to pick one or more of the selections. For example, if two target symbols are indicated on the reels in a spin, the gaming device enables the player to pick two of the selections in that spin. The gaming device determines the modifier associated with each of the picked selections, if any, in each spin. The gaming device provides the player with a total award in each of the spins where the total award is based on the award and/or modifiers obtained by the player in each spin. The total award in each of the spins is added to the player's total award indicated in the total award display. The gaming device or the player continues to spin the reels until there are no spins remaining. The gaming device then provides the player with the total award indicated in the total award display at the end of the game.

In another embodiment, each of the selections includes a modifier such as a multiplier. In one aspect of this embodiment, the multiplier associated with each selection is a base multiplier such as "1×" and therefore the multiplier increases by one for each target symbol indicated on the reels. In another aspect of this embodiment, the modifiers or multipliers are any desired values and the player obtains the total accumulated value of the multipliers associated with the picked selections in the game. In this embodiment, the player's total award is determined by multiplying the cumulative value of the multipliers or cumulative multiplier by the cumulative value of the awards or cumulative award from the activations of the reels in a game. The player receives the total award indicated by the total award display when there are no activations or spins remaining in the game.

In a further embodiment, the player accumulates multipliers in a game by picking selections for each target symbol indicated in the game. In each spin of the reels, the award indicated on the reels, if any, is multiplied by the total multiplier or cumulative multiplier accumulated by the player in the game. Therefore, the award in each spin, if any, is multiplied by the multiplier accumulated in that spin and each previous spin (i.e., the cumulative multiplier) and added to the total award in the game.

In one embodiment, a probability of being generated on the reels is associated with each of the award symbols and target symbols. In one embodiment, the probability of being generated on the reels associated with the target symbol is less than at least one of the probabilities associated with the award symbols. In another embodiment, the probability associated with the target symbol is less than a plurality of the probabilities associated with the award symbols. In another embodiment, the probability associated with the target symbol is less than all of the probabilities associated with the award symbols.

In another embodiment, one or more paylines are associated with the reels. The gaming device provides an award or awards associated with any indicated award symbols on the designated payline or paylines in a game. Additionally, the gaming device provides picks of the selections which correspond to the number of target symbols indicated on the designated payline or paylines in the game. It should be appreciated that any suitable number of paylines may be employed in a game.

In a further embodiment, the selections include modifiers such as positive values, negative values, null values or any other suitable modifiers as desired by the game implementor. The player picks selections corresponding to the number of indicated target symbols on the reels. The modifiers associated with the picked selections are added or combined with the player's total accumulated award in the game to provide a total award for the game.

In another embodiment, the modifiers associated with the selections are reset after each free spin of the reels. In this embodiment, the reset modifiers may be randomly determined modifiers or predetermined modifiers. In another embodiment, the modifiers associated with the selections are reset after a plurality of free spins of the reels. Furthermore, in one embodiment, one modifier is reset in one or more of the free spins of the reels. In another embodiment, a plurality of modifiers are reset in one or more free spins of the reels. In a further embodiment, all of the modifiers are reset in one or more of the free spins of the reels.

In a further embodiment, the selections include one or more awards in addition to the multipliers such as values, credits, multiplier incrementors, free spins of the reels and free games. By providing additional awards to a player, the gaming device enables the player to accumulate more awards and larger awards in the game.

Although the present invention is described with respect to a free spins game or a bonus game, it should be appreciated that the present invention may be employed as a primary game, or bonus game or any other suitable type of game in a gaming device. Additionally, although the present invention is described with respect to a reel type game, it should be appreciated that the present invention may be employed in any suitable non-reel type games such as a video poker game.

It is therefore an advantage of the present invention to provide a gaming device, which provides larger awards to players.

Another advantage of the present invention is to provide a gaming device that increases the number of award opportunities in a game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
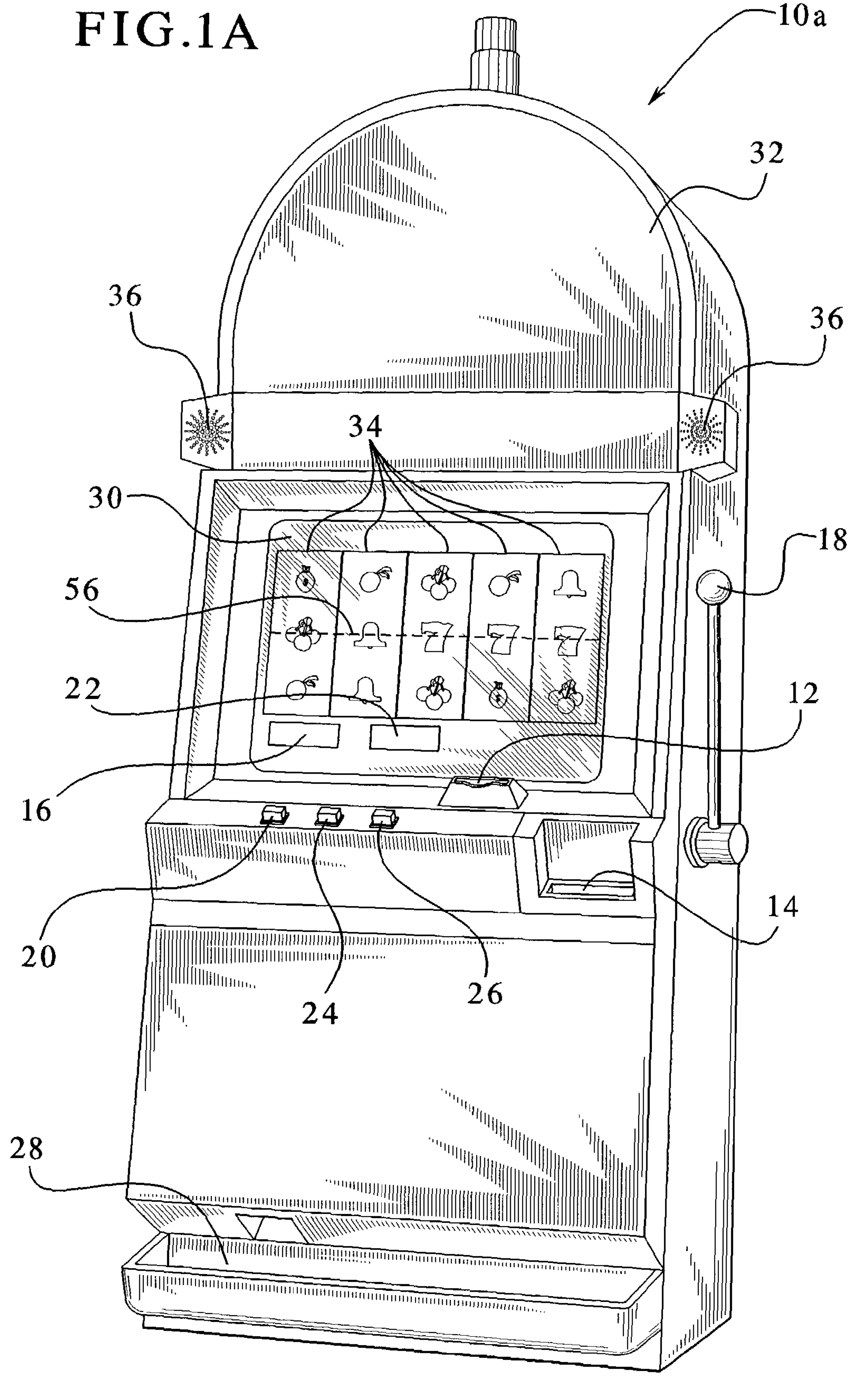
FIG. 1A is a front perspective view of one embodiment of the gaming device of the present invention.
Figure 1B:
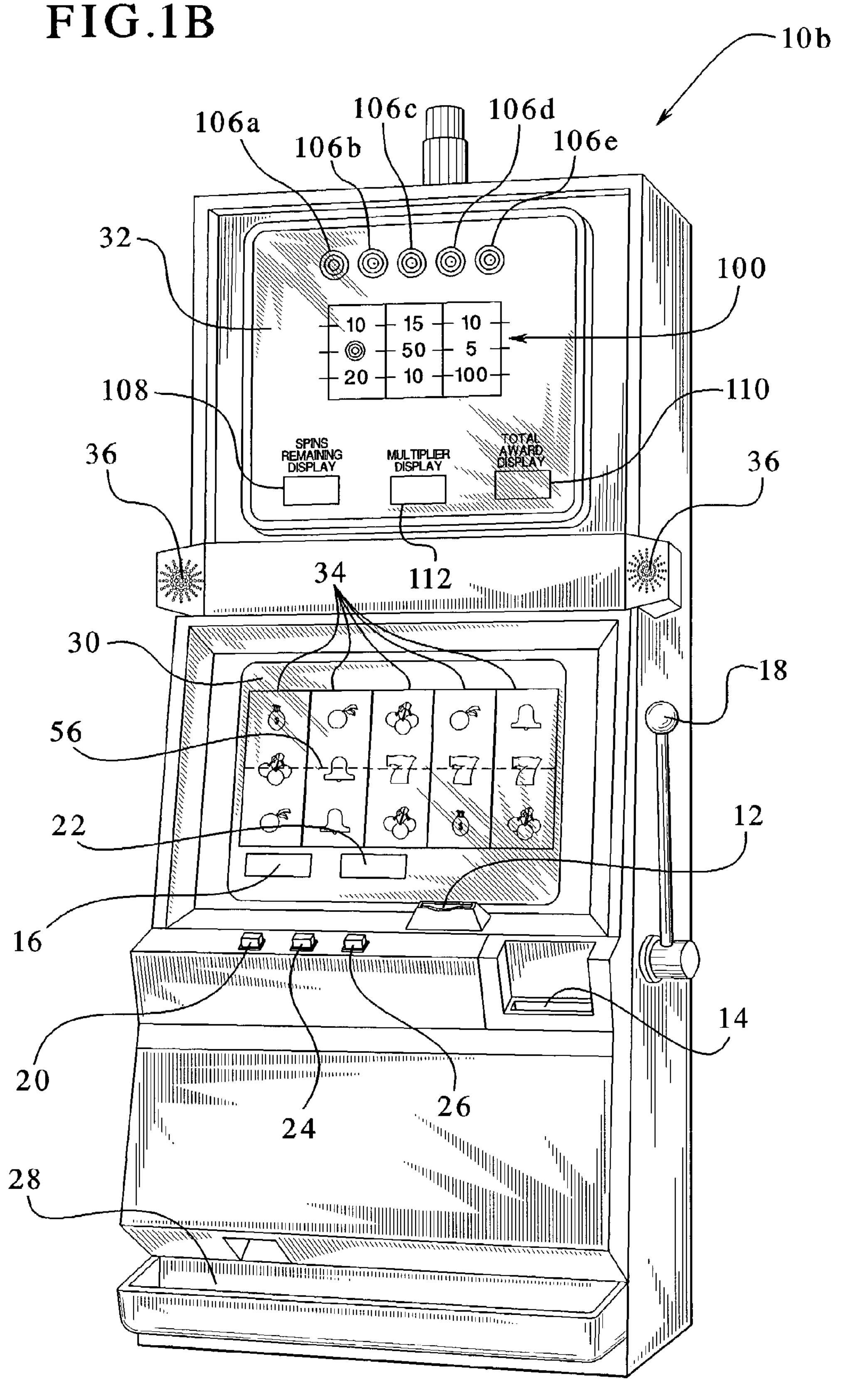
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device, which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, an upper display device 32, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
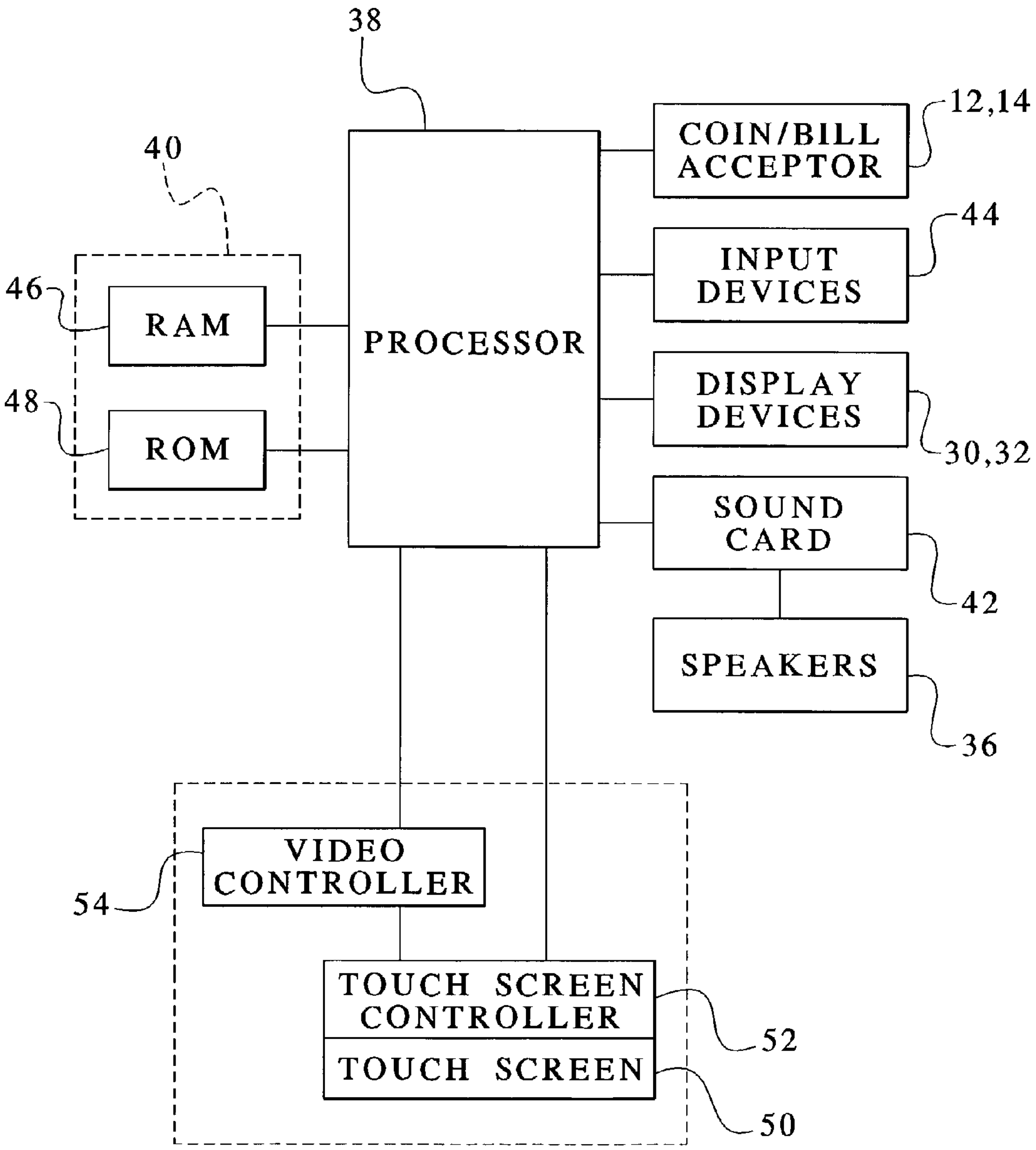
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a data network such as a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Activated and Player Selected Modifier

In one embodiment of the present invention, if a player achieves a bonus triggering or qualifying condition during the primary game, the gaming device 10 initiates a free spins game. In the free spins game, the gaming device provides one or more free spins of the reels to the player. The gaming device or player continues to spin or activate the reels until there are no free spins remaining in the game. In another embodiment, if a re-triggering event occurs in a game, the gaming device re-triggers or re-spins the reels in the game (i.e., provides additional free spins in the game). The re-triggering event may be a re-trigger symbol occurring on the reels, a re-trigger symbol combination occurring on the reels or any suitable event. It should be appreciated that the gaming device may re-trigger or re-spin the reels one or more times in the game.

Figure 3:
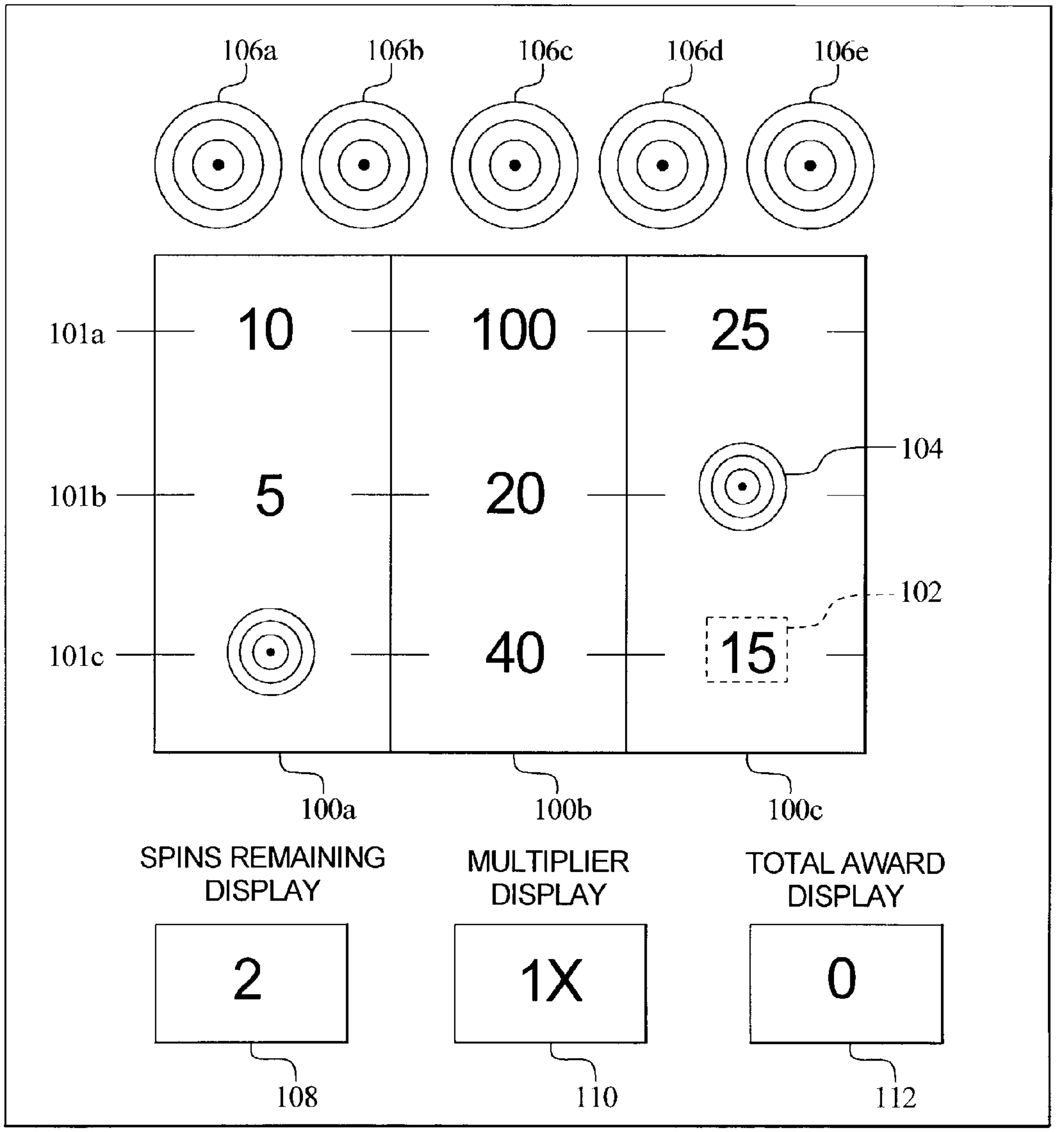
FIG. 3 is an enlarged elevation view of one embodiment of the present invention.

Referring to FIG. 3, one embodiment of the present invention is illustrated. In this embodiment, the gaming device includes a plurality of reels displayed to a player and provides the player with a designated number of free spins. The reels may be mechanical reels or video reels as described above. The reels have a plurality of symbols including award symbols and at least one target symbol. A plurality of awards are associated with the award symbols 102 or combinations of the award symbols and the awards may be values, credits, free spins, free games, multipliers or any suitable award or awards. In addition, one or more target symbols 104 are included on the reels. The target symbols 104 are designated as targets or "bull's-eyes" symbols. However, it should be appreciated that the target symbols 104 may be any suitable symbol related to the theme of the game or any other suitable symbol. It should also be appreciated that although the award symbols are illustrated as numeric values, the award symbols may be any suitable symbols such as conventional symbols on slot machines wherein individual symbols or specific combinations of symbols result in wins or award outcomes.

In each free spin of the reels, the gaming device displays a plurality of selections 106 to the player and enables the player to pick the selections when one or more of the target symbols 104 are indicated on the reels. Each of the selections include at least one game function such as a modifier, multiplier, positive value, negative value, null value or zero value or any other suitable modifier. In addition, the selections may include one or more extra or additional awards such as values, credits, multiplier incrementors, free spins of the reels, free games, any combination of these awards or any other suitable awards. The selections 106 may be any suitable number of selections as desired by the game implementor. In the embodiment shown in FIG. 3, the gaming device displays five selections 106*a*, 106*b*, 106*c*, 106*d* and 106*e*. In this embodiment, the selections are displayed at the top of the reels. It should be appreciated that the selections may be displayed in any location on display devices 30 or 32 of the gaming device. Furthermore, the selections 106 are presently shown as target or bull's-eye symbols, however, the symbols may be any suitable shape, character or symbol as desired by the game implementor.

In a game, the gaming device or the player spins or activates the reels for the determined or designated number of spins such as a number of free spins. The designated number of spins may be predetermined, randomly determined by a wager made by a player or using any suitable method. The gaming device provides an award for any award symbols indicated on the reels. The gaming device also provides one or more picks of the selections corresponding to the number of target symbols indicated on the reels. For example, if two target symbols are indicated on the reels then the gaming device provides two picks of the selections. If three target symbols are indicated on the reels, the gaming device provides three picks of the selections. The player picks the selections based on the number of target symbols indicated on the reels and receives at least one game function such as one modifier or multiplier associated with each of the picked selections.

In one embodiment, the game function includes a modifier or modifiers associated with the picked selections in each activation modify the awards, if any, obtained in that activation or spin or free spin of the reels. For example, in one free spin of the reels, an award of ten is associated with the indicated award symbols on the reels. In addition, a target symbol is indicated on the reels. The gaming device therefore enables the player to pick one of the selections displayed to the player in the game. The player picks one of the selections and reveals the modifier associated with the picked selection, which is 2×. The award of ten is multiplied by the modifier, 2×, to provide a total award of twenty in that spin. The total award of twenty is added to the player's total award for the game as indicated in the total award display. The gaming device continues to spin the reels and provide the player with a total award, if any, in each of the free spins of the reels until there are no free spins remaining in the game.

Alternatively, the gaming device or player may determine when the total award is provided to the player in the game. For example, after one of the activations or free spins of the reels, the cumulative award equals one hundred and the cumulative modifier is 3×. The gaming device or player may choose to determine the total award based on the indicated cumulative award of one hundred and the cumulative modifier of 3× at that point in the game and add the determined total award of three hundred to the player's total award in the total award display. The gaming device then resets the selections prior to the next spin in the game, if any. It should be appreciated that the gaming device or player may choose to determine the total award after each of the free spins or after a plurality of free spins in the game.

In another embodiment, the modifiers associated with the picked selections and the awards, if any, associated with the award symbols indicated in each of the free spins or activations are accumulated to provide a cumulative modifier and a cumulative award to the player in the game. The gaming device continues to activate or spin the reels until there are no activations, or free spins, remaining in the game. The cumulative modifier modifies the cumulative awards, if any, at the end of the game to determine the total award for the game.

One or more paylines such as paylines 101*a*, 101*b* and 101*c* are associated with the reels. In one embodiment, the gaming device provides an award and/or one or more picks of the selections when any of the award symbols or target symbols are indicated on one of the paylines. In another embodiment, the gaming device provides an award and/or one or more picks of the selections when the award symbols and/or the target symbols are indicated on any of the paylines. The gaming device also includes a spins remaining display 108, which indicates the number of spins remaining in a game, a modifier display such as a multiplier display 110, which indicates the value of any multipliers obtained by a player in the activations of a game, and a total award display 112, which indicates the total award accumulated by the player in the game.

Referring to FIGS. 4A to 4D, an example of the embodiment of FIG. 3 is illustrated where the player begins the game with three spins of the reels 100*a*, 100*b* and 100*c*. In this example, the gaming device provides awards and/or picks of the selections 106 when the award symbols and/or one or more target symbols are indicated on payline 101*b* in one or more of the free spins of the reels. Additionally, the gaming device provides a base modifier, such as a base multiplier of "1×" as indicated in the multiplier display 110. Any additional modifiers or multipliers obtained by the player in the game will be added to the multiplier indicated in multiplier display 110. The player also begins the game with an award of zero as indicated in the total award display 112.

In this example, the gaming device provides any awards associated with the award symbols to the player indicated on payline 101*b* and any multipliers (i.e., modifiers), which are associated with any of the selections 106 picked by the player when one or more target symbols are indicated on payline 101*b*. Therefore, in this example, the player receives a total award in each activation, which equals the award or awards associated with any award symbols indicated on payline 101*b* in each of the activations multiplied by any multipliers associated with the picked selections 106 in each of the activations. The gaming device adds the multiplied awards in each of the activations to the player's total award in the total award display 112 in each activation and the player receives the total award indicated in the total award display 112 at the end of the game (i.e., when there are no spins remaining in the game).

Figure 4A:
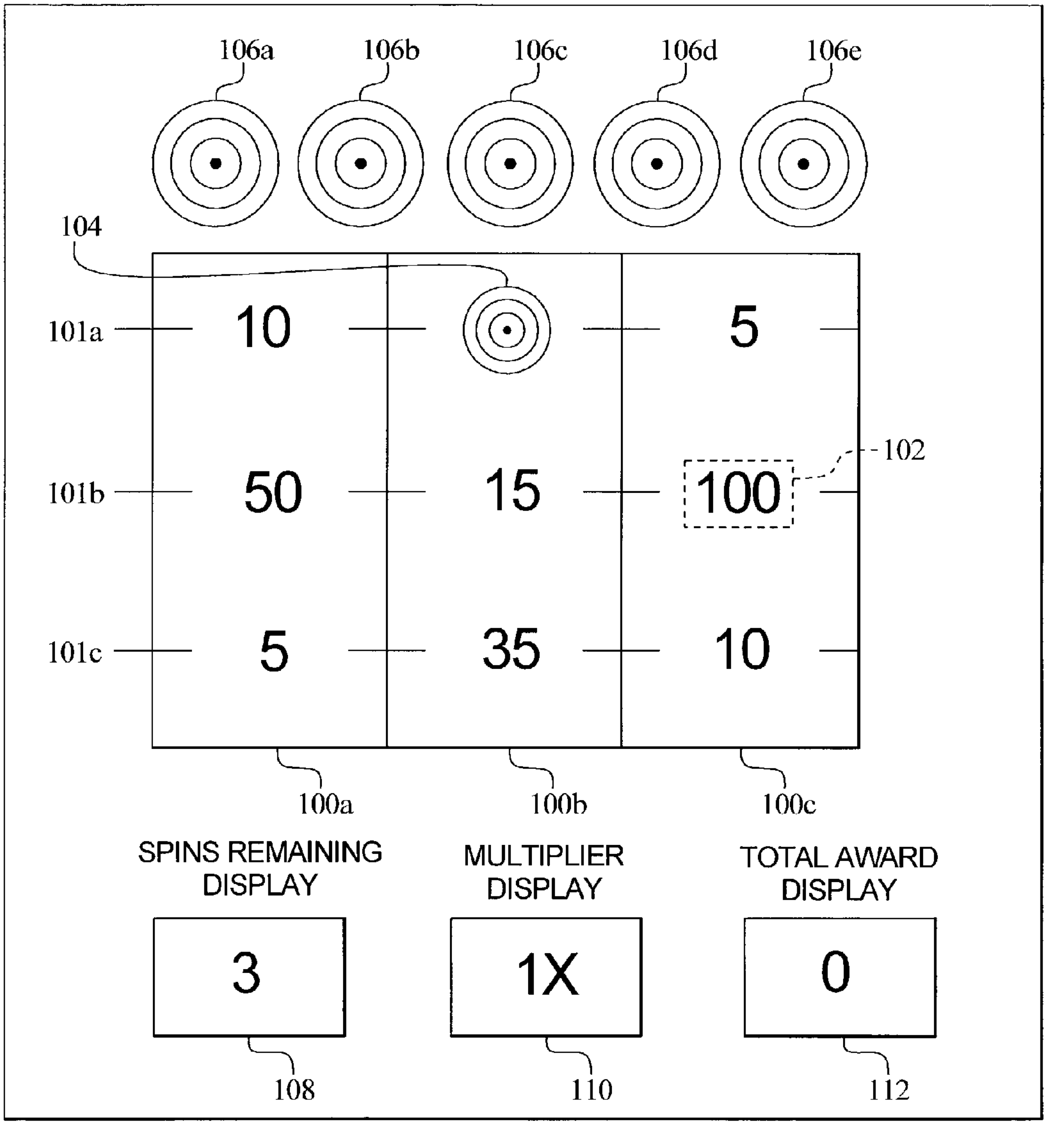
FIGS. 4A, 4B, 4C and 4D are enlarged elevation views of an example of the embodiment of FIG. 3 where a player begins the game with three free spins of the reels and the player may obtain one or more modifiers in each spin of the reels.
Figure 4B:
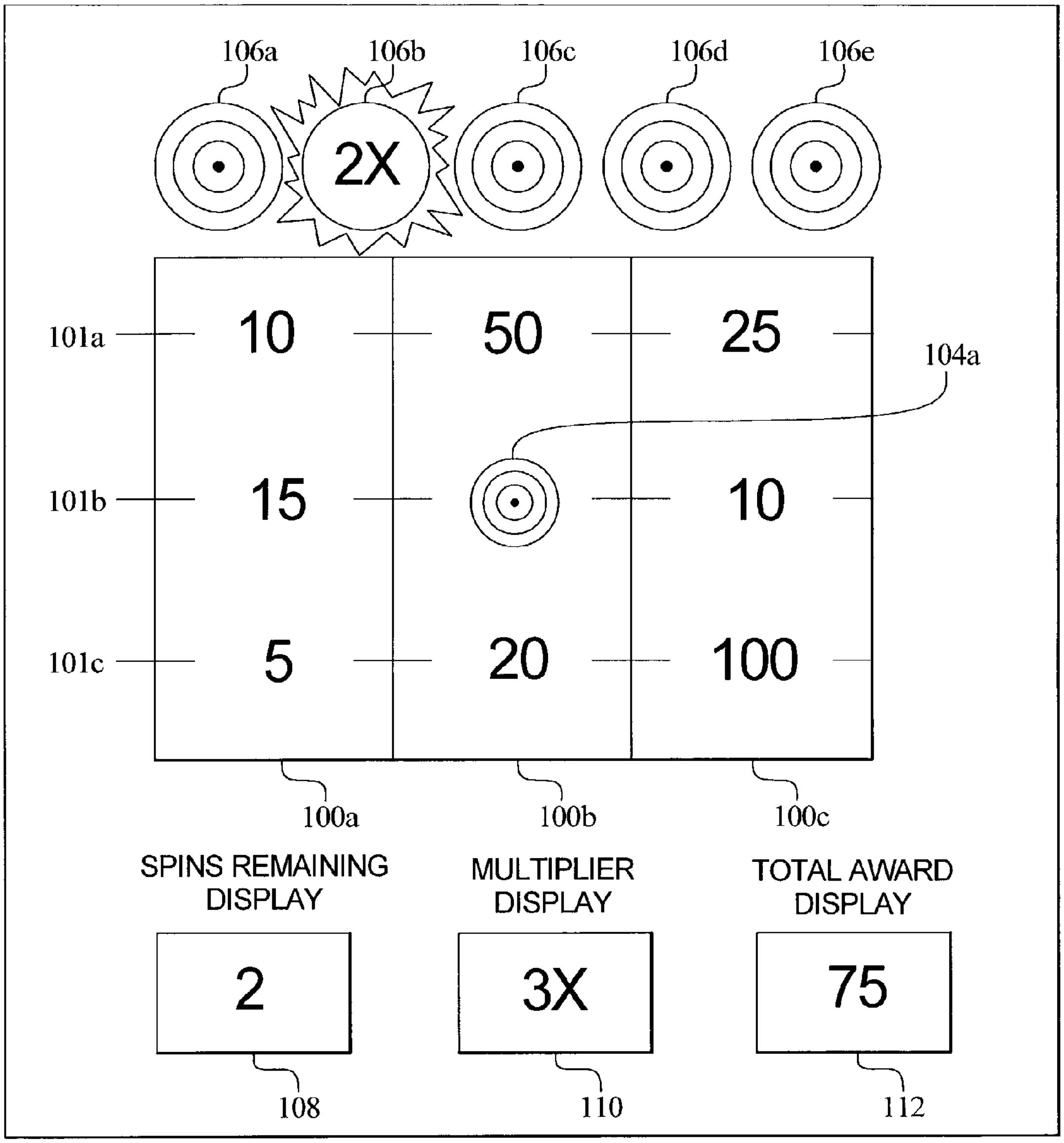

Referring to FIG. 4B, the gaming device activates or spins the reels for the first time in the game. The reels stop and two award symbols of fifteen and ten and one target symbol 104*a* are indicated on payline 101*b*. The gaming device enables the player to pick one of the selections 106 for each target symbol indicated on payline 101*b*. In this activation, one target symbol 104*a* is indicated on payline 101*b*, and therefore, the player obtains one selection or pick of the selections 106. The player picks selection 106*b*, which indicates a multiplier of 2×. The multiplier, 2×, is transferred to the multiplier display 110 to give the player a total multiplier of 3× in the game. The player also receives an award associated with the indicated award symbols on payline 101*b*. The award of twenty-five, which is the sum of the individual awards of fifteen and ten indicated on the payline 101*b*, is multiplied by the multiplier associated with the picked selection by the player, which is 3×, to provide the player with a total award of fifty in this activation. An award of fifty is added to the player's total award of zero indicated in the total award display 112 to give the player a total award of seventy-five in the game. The gaming device resets the multiplier display 110 to the base multiplier of 1×. The player has only two spins remaining in the game as indicated by the spins remaining display 108.

Figure 4C:
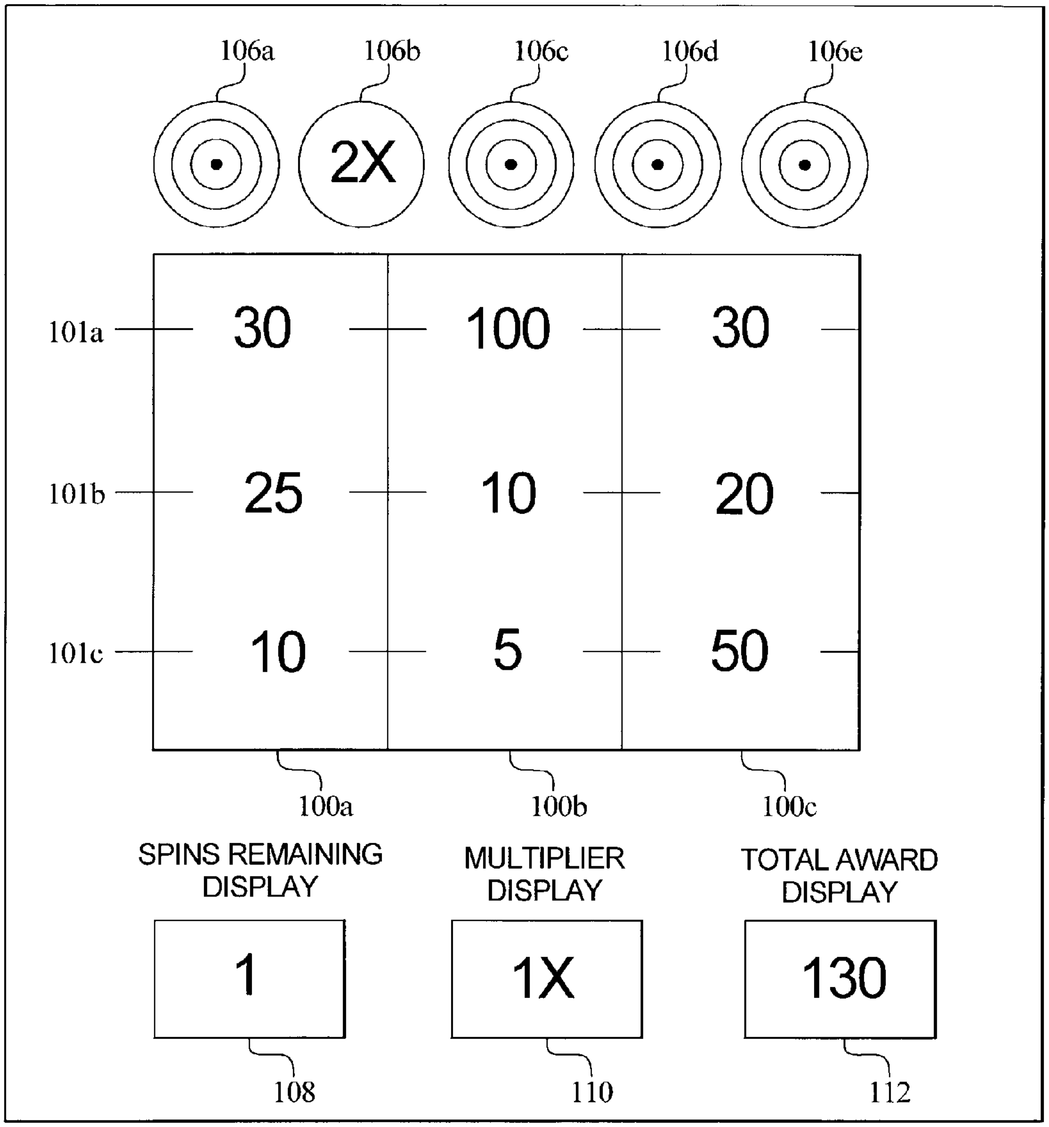

Referring to FIG. 4C, the gaming device activates or spins the reels 100 for a second time in the game. The reels stop spinning and indicate three award symbols on the payline 101*b*. The award symbols include awards of twenty-five, ten and twenty, respectively. Because the player did not obtain one or more target symbols on payline 101*b*, the gaming device does not allow the player to pick one or more of the selections 106 in this activation. The multiplier remains at 1× as indicated in the multiplier display 110. Instead, the player receives the total of the awards associated with the indicated award symbols on the payline 101*b*. The total award in this spin is fifty-five, which is added to the player's total award as indicated in the total award display 112. The player's new total award is one hundred thirty as indicated in the total award display 112. The player has one spin remaining as indicated by the spins remaining display 108.

Alternatively, in another embodiment, the multiplier or multipliers associated with the picked selections in a spin are employed in a subsequent spin in the game. For example, in FIG. 4B, the player obtained an award of twenty-five and a multiplier of 3× in that spin of the reels. In this embodiment, the multiplier 3× is applied to the subsequent spin of the reels shown in FIG. 4C. Therefore, in the next spin of the reels shown in FIG. 4C, the player obtains an award of fifty-five, which is now multiplied by the multiplier 3× obtained in the previous spin, to provide the player with an award of one hundred sixty-five for this spin. It should be appreciated that the multiplier may be applied in a subsequent spin of the reels or a plurality of subsequent spins of the reels.

Figure 4D:
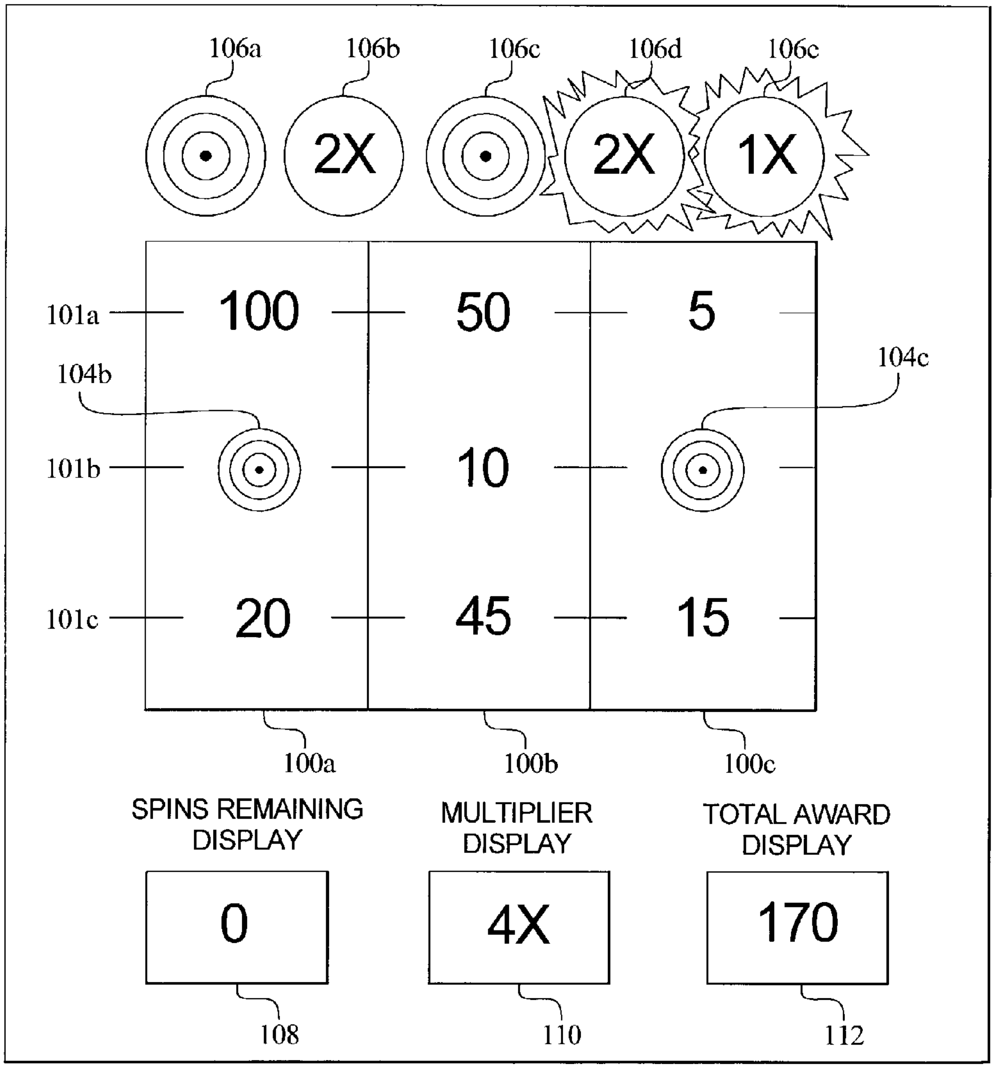

Referring to FIG. 4D, the gaming device activates or spins the reels for the final time in this game. In this spin, one award symbol and two target symbols 104*b* and 104*c* are indicated on payline 101*b*. The gaming device enables the player to pick one of the selections for each of the target symbols indicated on payline 101*b*. Therefore, the player picks any two of the remaining selections 106*a*, 106*c*, 106*d*, and 106*e*. The player picks selections 106*d* and 106*e*, which indicate multipliers of 2× and 1×, respectively. The indicated multipliers are added to the base multiplier of 1× to provide a total multiplier of 4× in this activation as indicated in the multiplier display 110. The award associated with the indicated award symbol, which is ten, is multiplied by the total multiplier in that activation, which is 4×, to provide a total award in the activation of forty. The total award of thirty in this activation is added to the player's total award in the game. The player's new total award in the game is an award of one hundred seventy as indicated in the total award display 112. The player does not have any spins remaining in the game as indicated in the spins remaining display 108, and therefore, the game ends and the player receives the total award of one hundred seventy indicated in the total award display 112.

Referring to FIGS. 5A to 5E, an example of another embodiment of the present invention is illustrated where the gaming device initially displays a plurality of selections such as selections 106*a*, 106*b*, 106*c*, 106*d* and 106*e* to a player and provides three free spins of the reels to the player in the game. The selections include modifiers such as multipliers (shown in phantom), which may be any suitable multiplier. In the illustrated embodiment, the selections include multipliers of 1× and therefore, the total multiplier in the game increases by one for each pick of the selections obtained by the player in the game. In another embodiment, the multipliers may be any value and the player accumulates a total multiplier based on the individual multiplier values associated with the selections picked by the player in the game. A spins remaining display 108 indicates the number of spins remaining in the game. A multiplier display 110 initially indicates a base multiplier such as the multiplier 1×, and subsequently indicates the total multiplier accumulated by the player in the game. A total award display indicates a total award accumulated by the player in the game. At the end of the game, the total or cumulative multiplier is multiplied by the total or cumulative award in the game to provide a total award to the player at the end of the game.

Figure 5A:
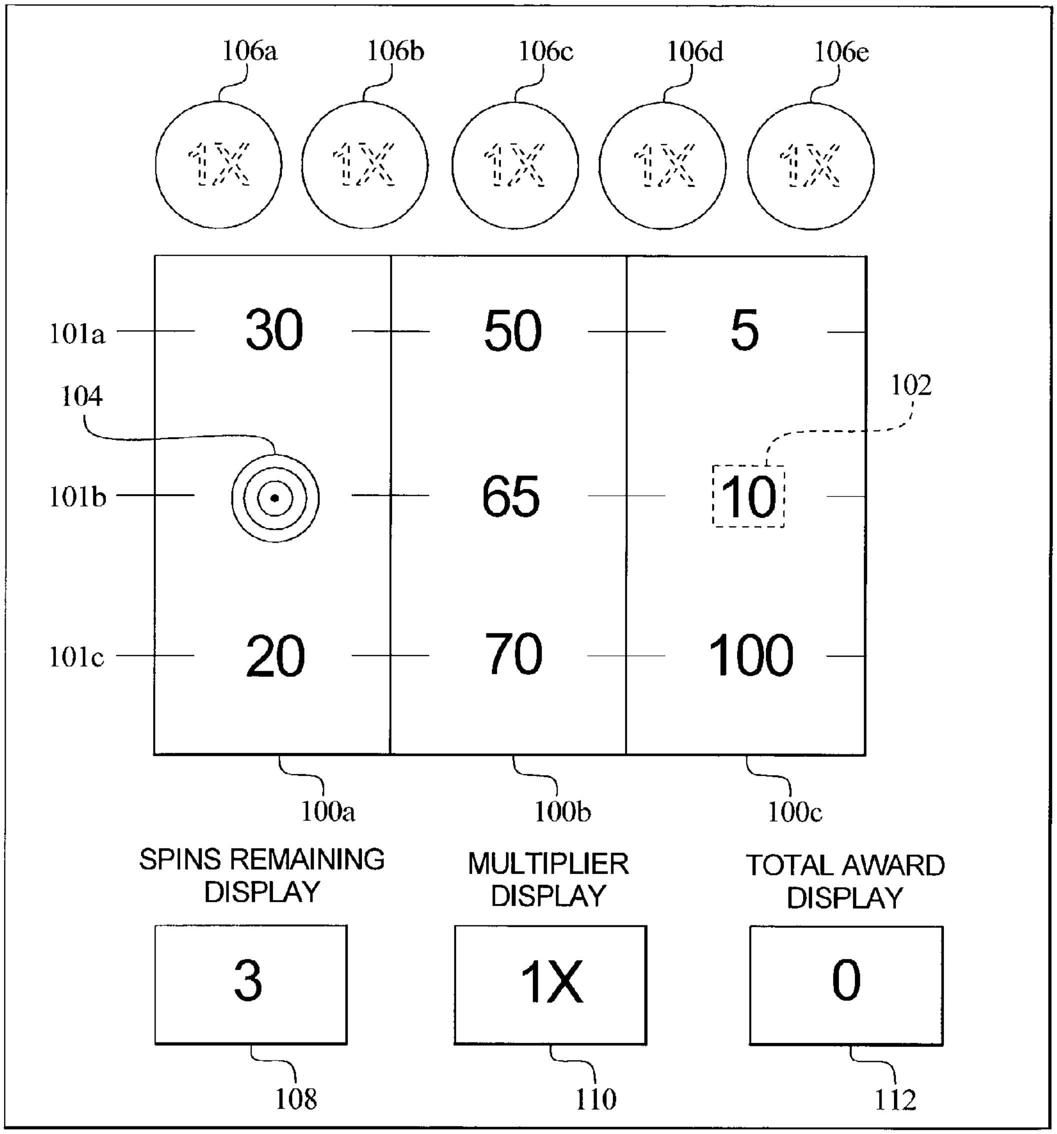
FIGS. 5A, 5B, 5C, 5D and 5E are enlarged elevation views of an example of another embodiment of the present invention where the modifiers associated with the picked selections are accumulated during a free spins game.
Figure 5B:
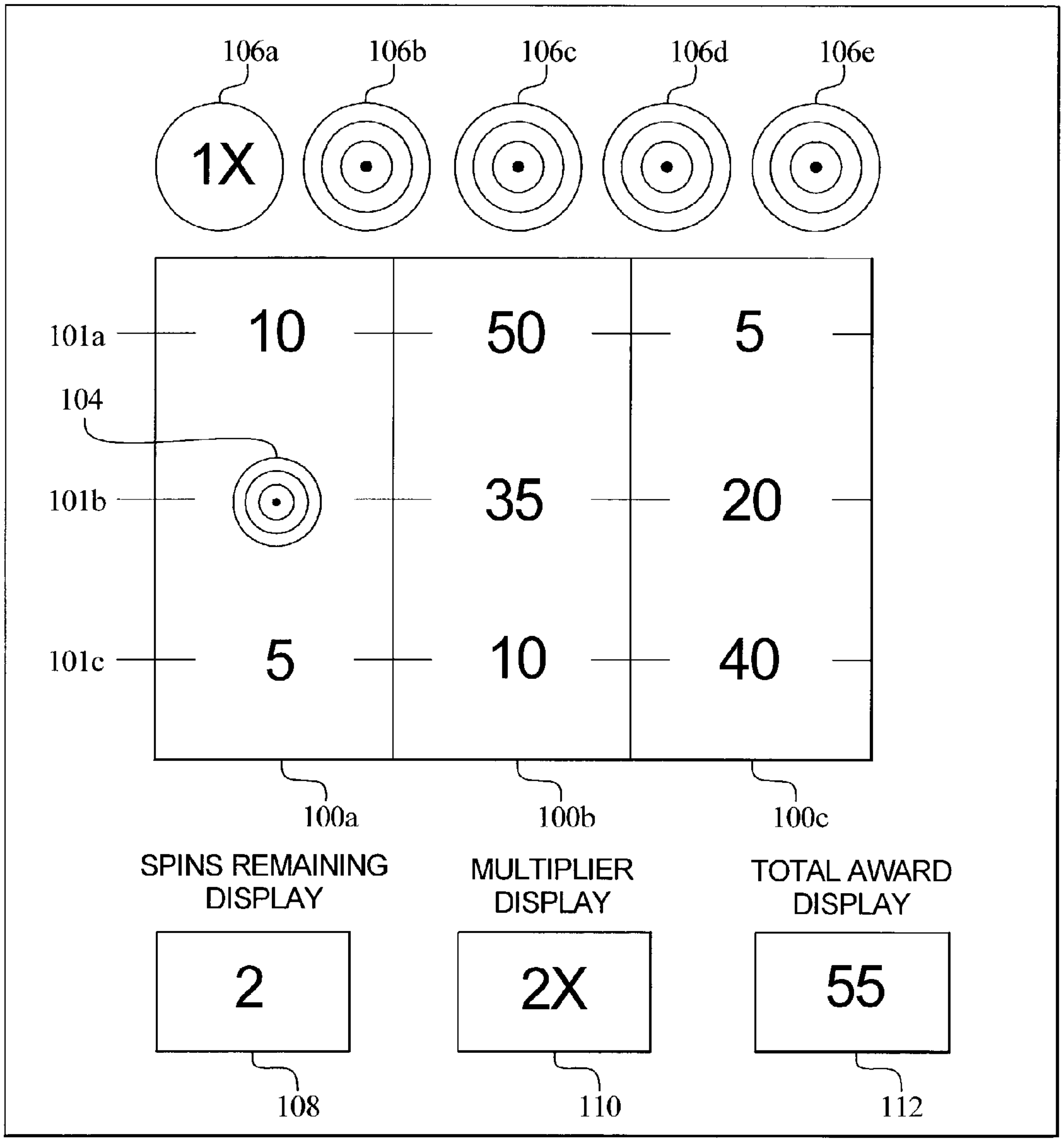

Referring to FIG. 5B, the gaming device activates or spins the reels for the first time in the game. The reels stop spinning and two award symbols and one target symbol 104 are indicated on the payline 101*b*. The awards associated with the indicated award symbols on payline 101*b* are thirty-five and twenty, respectively. The gaming device enables the player to pick one of the selections 106 because one target symbol is indicated on the payline 101*b*. It should be appreciated that a player picks a number of selections that equals the number of target symbols indicated on the payline 101*b*. Therefore, if the player obtains two target symbols on the payline 101*b*, the player picks two of the selections 106. In this spin, the player picks selection 106*a*, which reveals a multiplier of 1×. It should be appreciated that in this example because each of the multipliers associated with the selections are the same (i.e., 1×), the gaming device may automatically reveal one or more of the selections 106 as the target symbols are indicated on the payline 101*b* in the game. The multiplier 1× associated with the picked selection 106*a* is added to the base multiplier of 1× to provide a total multiplier of 2× as indicated by the multiplier display 110. The award of fifty-five associated with the indicated award symbols is added to the player's total award as indicated in the total award display 112. The player now has two spins remaining in the game as indicated in the spins remaining display 108.

Figure 5C:
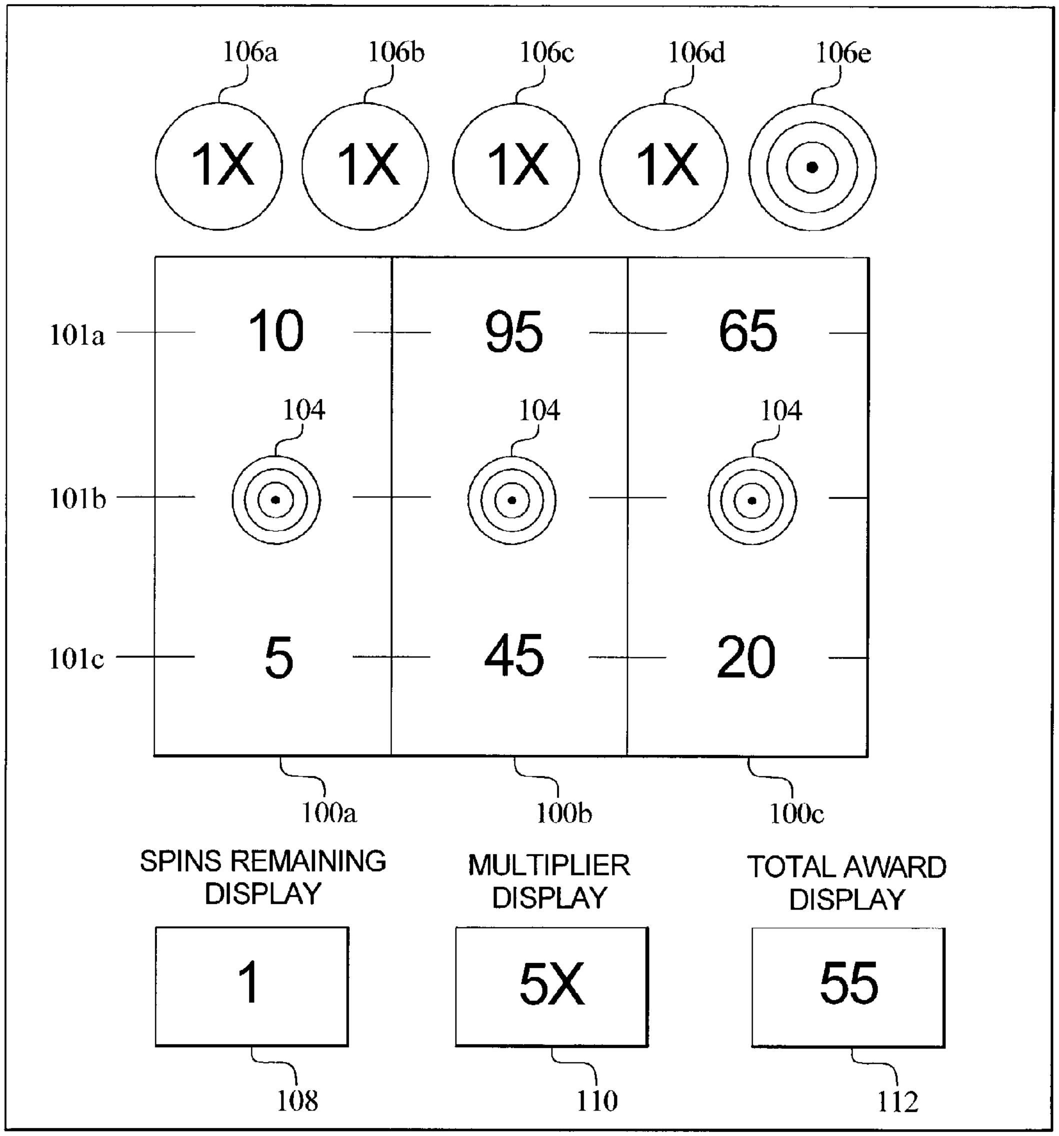

Referring to FIG. 5C, the gaming device activates or spins the reels for the second time in the game. The reels stop spinning and indicate three target symbols 104 on the payline 101*b*. The player therefore receives three picks of the selections 106 where the three picks correspond to the three target symbols indicated on the payline 101*b*. In one embodiment, the gaming device also provides an additional award to the player when three target symbols are indicated on a payline. In another embodiment, the gaming device does not provide any additional awards to the player when a designated number of target symbols such as three target symbols are indicated on a payline. In this example, the player does not receive an additional award. The player picks selections 106*b*, 106*c* and 106*d*, which each reveal a multiplier of 1×. The total value of the multipliers revealed in this activation is 3×, which is added to the total multiplier value indicated in the multiplier display 110. The total multiplier is now 5× as indicated in the multiplier display 110. The player did not receive an award in this activation and therefore, the total award of fifty-five does not change as indicated in the total award display 112. The player now has one spin remaining in the game as indicated in the spins remaining display 108.

Figure 5D:
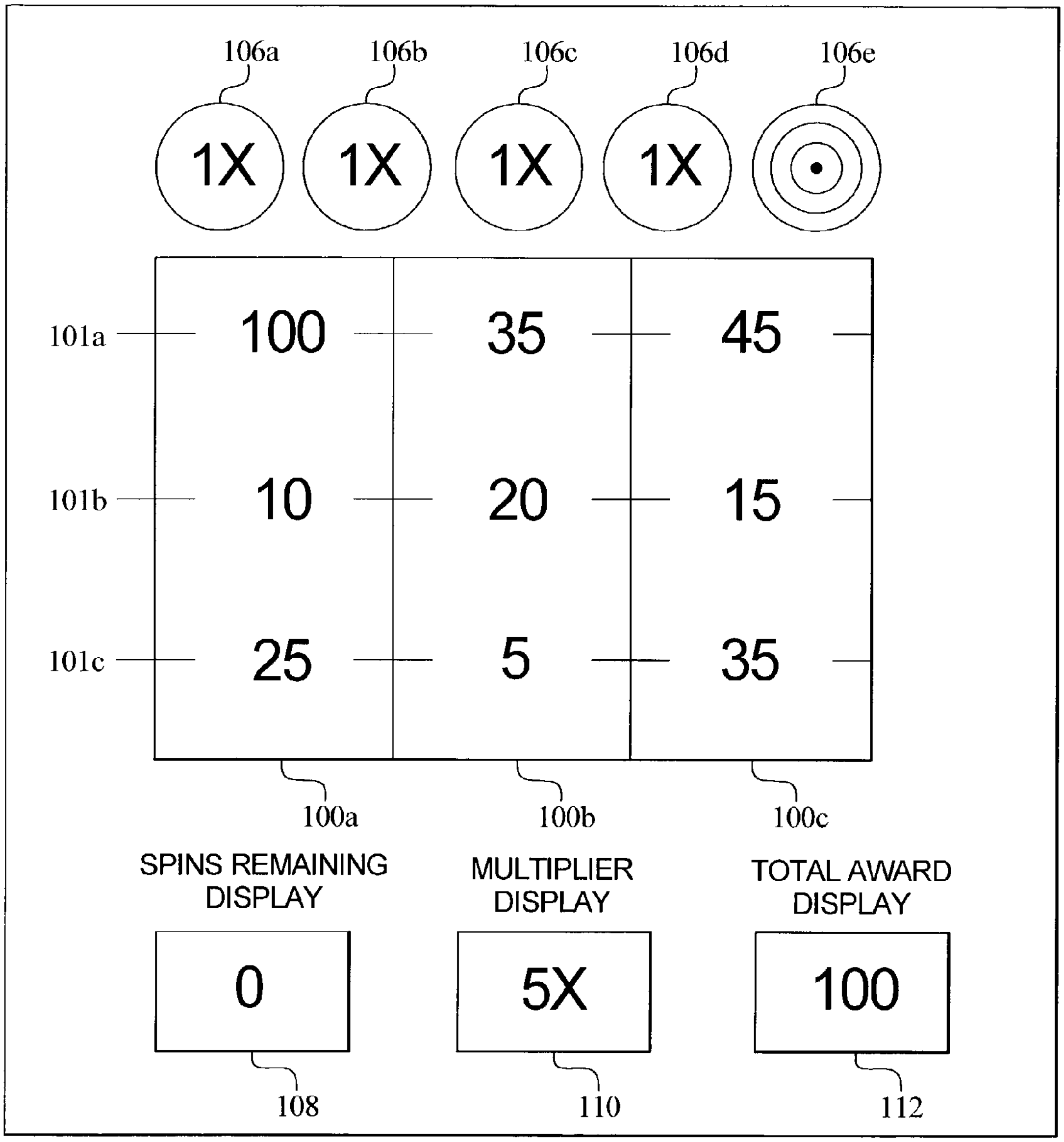

Referring to FIG. 5D, the gaming device spins or activates the reels for a final time in the game. The reels stop spinning and indicate three award symbols on the payline 101*b*. The awards of ten, twenty and fifteen are associated with the award symbols indicated on payline 101*b*. Thus, an award of forty-five is provided to the player in this activation and added to the player's total award as indicated in the total award display 112. The player now has a total award of one hundred in the game as indicated in the total award display 112. Additionally, the player has accumulated a total multiplier of 5× as indicated in the multiplier display 110. The player does not have any spins remaining as indicated in the spins remaining display 108.

Figure 5E:
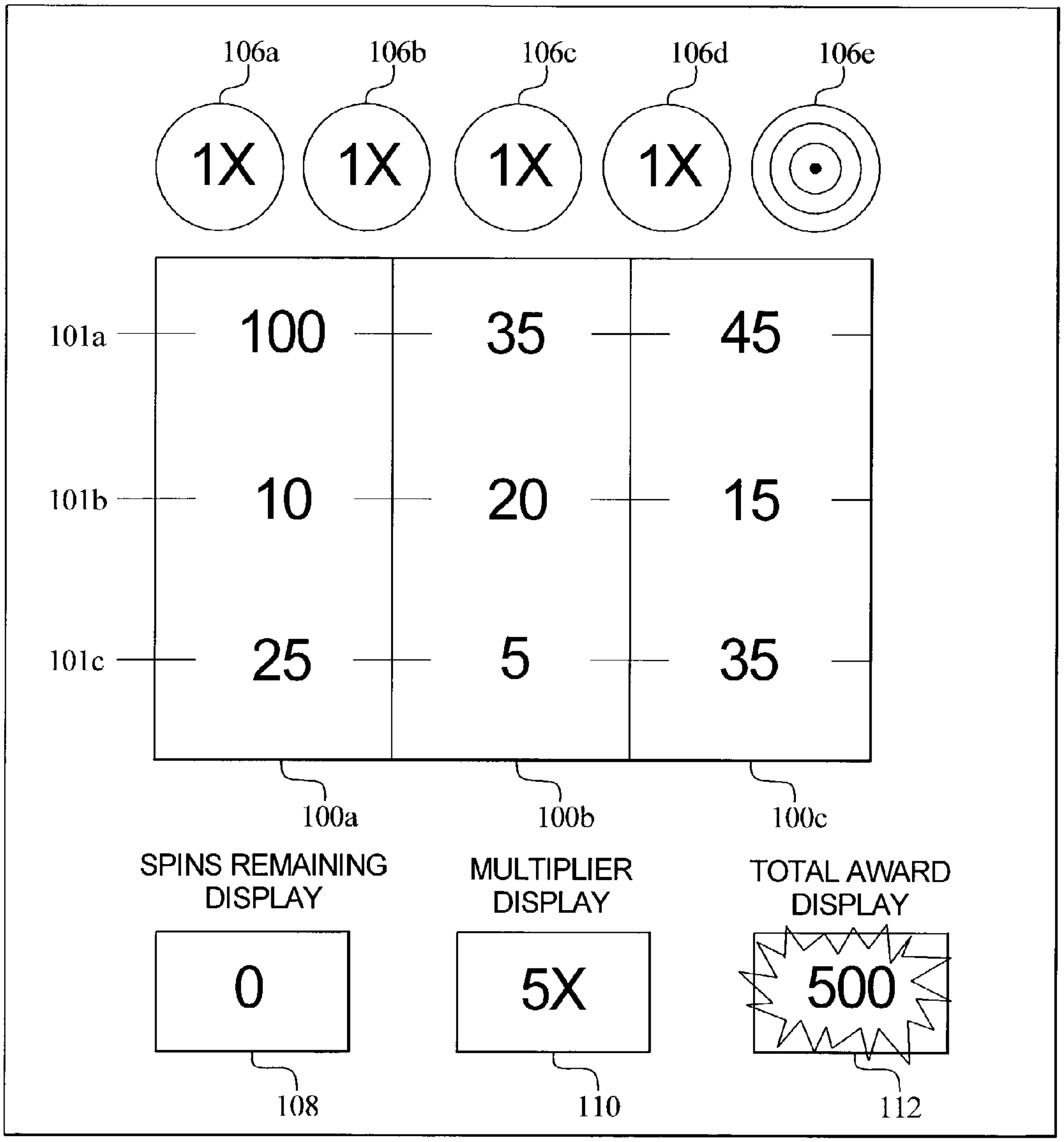

Referring to FIG. 5E, because the game has ended, the total accumulated award or cumulative award of one hundred is multiplied by the total accumulated multiplier or cumulative multiplier of 5× to provide a total award of five hundred to the player in the game. Thus, in this embodiment, the player received a very large award because the awards and the multipliers are accumulated during the game and then multiplied together at the end of the game to produce the large total award for the game.

In a further embodiment, in each spin of the reels, the award indicated on the reels, if any, is multiplied by the total multiplier or cumulative multiplier accumulated by the player. Therefore, the award in each spin, if any, is multiplied by the cumulative multiplier including any multiplier obtained in such spin and added to the total award in the game. For example, in FIG. 5B, the award of fifty-five is multiplied by the cumulative multiplier 2× to provide an award of one hundred ten for that spin. The award of one hundred ten is then added to the total award display in the game. The gaming device continues to spin the reels until there are no spins remaining in the game.

Figure 6:
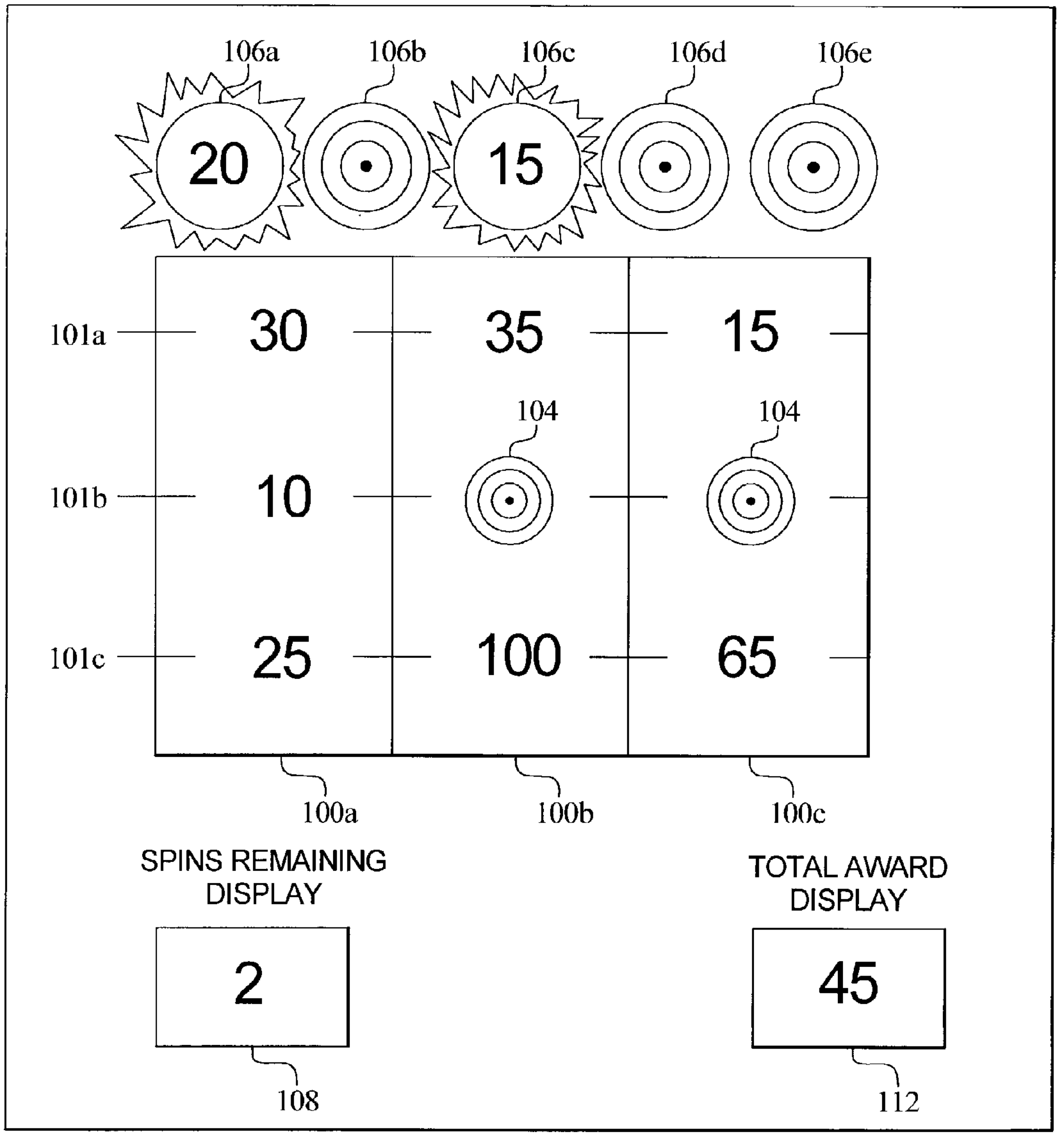
FIG. 6 is an enlarged elevation view of a further embodiment of the present invention.

Referring to FIG. 6, a further embodiment of the present invention is illustrated where the modifiers associated with the selections 106 are positive values, which are added to the player's total award in the game. In the embodiment shown in FIG. 6, the values are integers such as the values of twenty and fifteen associated with selections 106*a* and 106*c*, respectively. It should be appreciated that the modifiers associated with the selections 106 may be any suitable modifier such as positive values, negative values, null or zero values, multipliers, or any other suitable modifier or modifiers.

In another embodiment, the gaming device provides one or more frees spins to a player in a primary game or other suitable game, and resets the selections (i.e., resets the modifiers associated with the selections) after one or more free spins of the reels. The selections may be reset so that the same modifier is associated with each of the selections, different modifiers are associated with a plurality of the selections or different modifiers are associated with all of the selections. In one aspect of this embodiment, the gaming device resets the selections after each spin of the reels. In another aspect of this embodiment, the gaming device resets the selections after a plurality of spins of the reels.

Although this embodiment is primarily shown in a free spins game or bonus game, it should be appreciated that the present invention may be employed in a primary game including a reset button or function, which enables a game implementor to reset the multiplier and/or the award to a predetermined value in each game. It should also be appreciated that the present invention may be employed in other types of games such as non-reel type games (i.e., poker games), sub-games, or other suitable games.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention claimed is:

1. A gaming device comprising:

a game;

a plurality of reels including a plurality of symbols, said symbols including a plurality of award symbols and at least one target symbol;

a plurality of awards associated with the award symbols or combinations of the award symbols;

a plurality of selections associated with the target symbol, each of said selections including at least one game function, wherein a number of said selections are available to be picked by a player; and a plurality of free spins of the reels provided to the player in a play of the game wherein for each of said provided free spins, until there are no free spins remaining, a processor is operable to:

(a) activate the reels to randomly generate a plurality of the symbols on the reels, wherein said generated symbols include zero, one or more target symbols, (b) determine an award associated with any award symbols generated on the reels, (c) enable the player to pick one of the number of available selections for each of the target symbols generated on the reels, wherein the number of available selections is determined independently of the number of target symbols generated on the reels, (d) determine the game function associated with each of the picked selections, and (e) provide a total award based on the determined award and the determined game function associated with each picked selection.

2. The gaming device of claim 1, which includes a plurality of target symbols on the reels.

3. The gaming device of claim 1, which includes a probability of being generated on the reels associated with the award symbols and the target symbol.

4. The gaming device of claim 3, wherein the probability associated with the target symbol is less than at least one of the probabilities associated with the award symbols.

5. The gaming device of claim 3, wherein the probability associated with the target symbol is less than a plurality of the probabilities associated with the award symbols.

6. The gaming device of claim 3, wherein the probability associated with the target symbol is less than all of the probabilities associated with the award symbols.

7. The gaming device of claim 1, wherein the game function includes at least one multiplier.

8. The gaming device of claim 1, wherein the game functions include at least one of the following: at least one credit, at least one positive value, at least one negative value, at least one null value, at least one multiplier, at least one multiplier incrementor, at least one free spin of the reels and at least one free game.

9. The gaming device of claim 1, which includes a payline associated with the reels.

10. The gaming device of claim 9, wherein the award is associated with the award symbols generated on the payline.

11. The gaming device of claim 9, wherein the processor enables the player to pick one of the number of available selections for each of the target symbols generated on the payline.

12. The gaming device of claim 1, which includes a plurality of paylines.

13. The gaming device of claim 12, wherein the award is associated with the award symbols generated on one of the paylines.

14. The gaming device of claim 12, wherein the processor enables the player to pick one of the number of available selections for each of the target symbols generated on one of the paylines.

15. The gaming device of claim 1, which includes a reset, said reset being operable to reset the game function associated with at least one of the selections.

16. The gaming device of claim 1, which includes a reset, said reset being operable to reset the game function associated with a plurality of the selections.

17. The gaming device of claim 1, which includes a reset, said reset being operable to reset the game function associated with all of the selections.

18. The gaming device of claim 1, which includes a reset, wherein the reset is operable to reset one or more of the game functions associated with the selections in each free spin of the reels.

19. The gaming device of claim 1, which includes a reset, wherein the reset is operable to reset one or more of the game functions associated with the selections in a plurality of free spins of the reels.

20. The gaming device of claim 1, wherein the number of free spins is randomly determined.

21. The gaming device claim 1, wherein the number of free spins is predetermined.

22. The gaming device of claim 1, wherein the number of free spins is based on a wager made by the player in the game.

23. The gaming device of claim 1, wherein the total award is based on the award in each free spin and the game function in each of said free spins, if any, and in each previous spin of the reels.

24. The gaming device of claim 1, wherein the total award is based on the sum of the awards in each free spin, if any, and any game function or functions determined in the previous spin to each of said free spins of the reels.

25. A gaming device comprising:

a game;

a plurality of reels including a plurality of symbols, the symbols including a plurality of award symbols and a plurality of target symbols;

a plurality of awards associated with the award symbols or combinations of the award symbols;

a plurality of selections displayed to a player, each of said selections including at least one game function, wherein a number of said selections are available to be picked by a player; and a plurality of free spins of the reels provided to the player in a play of the game, wherein for each of said provided free spins, until there are no free spins remaining, a processor is operable to:

(a) activate the reels to randomly generate a plurality of the symbols on the reels, wherein said generated symbols include zero, one, or more target symbols, (b) determine an award, if any, associated with the award symbols generated on the reels, (c) enable the player to pick one of the number of available selections for each of the target symbols generated on the reels, wherein the number of available selections is determined independently of the number of target symbols generated on the reels, (d) determine the game function associated with each of the picked selections, (e) determine a cumulative game function based on the determined game function or game functions associated with each of the picked selections, and (e) provide a total award based on the determined award and the determined cumulative game function.

26. The gaming device of claim 25, wherein the game functions include multipliers and wherein the total award equals the sum of the awards multiplied by the cumulative game function in each free spin.

27. A method of operating a gaming device, the method comprising the steps of:

(a) displaying a plurality of reels including a plurality of symbols, said symbols including a plurality of award symbols and a target symbol;

(b) displaying a plurality of selections associated with the target symbol, each of said selections including a game function, wherein a number of said selections are available to be picked by a player;

(c) providing a plurality of free spins of the reels to the player in a play of the game, and for each of said free spins until there are no free spins remaining:

(i) randomly generating a plurality of the symbols on the reels, wherein said generated symbols include zero, one, or more target symbols, (ii) determining any award associated with any award symbols generated on the reels, (iii) enabling the player to pick one of the number of available selections for each of the target symbols generated on the reels, wherein the number of available selections is determined independently of the number of target symbols generated on the reels, (iv) determining the game function associated with each of the picked, and (v) providing a total award to the player where the total award is based on the determined award and the determined game function associated with each picked selection.

28. The method of claim 27, which includes the step of randomly determining the number of free spins of the reels.

29. The method of claim 27, which includes the step of predetermining the number of free spins of the reels.

30. The method of claim 27, which includes the step of determining the number of free spins of the reels based on the player's wager.

31. The method of claim 27, which includes the step of associating a probability of being generated on the reels with each of the symbols, wherein the probability associated with the target symbol is less than the probability associated with at least one of the award symbols.

32. The method of claim 27, which includes the step of associating a probability of being generated on the reels with each of the symbols, wherein the probability associated with the target symbol is less than the probabilities associated with a plurality of the award symbols.

33. The method of claim 27, which includes the step of associating a probability of being generated on the reels with each of the symbols, wherein the probability associated with the target symbol is less than the probabilities associated with all of the award symbols.

34. The method of claim 27, wherein the game function includes at least one of the following: at least one credit, at least one positive value, at least one negative value, at least one null value, at least one multiplier, at least one multiplier incrementor, at least one free spin of the reels and at least one free game.

35. The method of claim 27, which includes the step of resetting the game functions associated with the selections in each free spin of the reels.

36. The method of claim 27, which includes the step of resetting the game functions associated with the selections in a plurality of free spins of the reels.

37. The method of claim 27, which includes the step of resetting at least one of the game functions associated with the selections in one or more free spins of the reels.

38. The method of claim 27, which includes the step of resetting a plurality of the game functions associated with the selections in one or more free spins of the reels.

39. The method of claim 27, which includes the step of resetting all of the game functions associated with the selections in one or more free spins of the reels.

40. The method of claim 27, wherein the step of determining the game function includes determining the game function associated with at least one previously picked selection, if any.

41. The method of claim 27, wherein the steps (a) to (c) are provided to the player through a data network.

42. The method of claim 41, wherein the data network is an internet.

43. A method of operating a gaming device, the method comprising the steps of:

(a) displaying a plurality of reels including a plurality of symbols, said reels including a plurality of award symbols and a plurality of target symbols;

(b) displaying a plurality of selections associated with the target symbols, each of said selections including a game function, wherein a number of said selections are available to be picked by a player;

(c) providing a plurality of free spins of the reels to the player in a play of the game, and for each of said free spins until there are no free spins remaining:

(i) randomly generating a plurality of the symbols on the reels, wherein said generated symbols include zero, one, or more target symbols, (ii) determining any award associated with any award symbols generated on the reels, (iii) enabling the player to pick one of the number of available selections for each of the target symbols generated on the reels, wherein the number of available selections is determined independently of the number of target symbols generated on the reels, (iv) determining the game function associated with each of the picked selections (v) determining a cumulative game function based on the determined game function or game functions, and (vi) determining a total award based on the determined award and the determined cumulative game function; and (d) providing the sum of the total awards from each spin to the player when there are no free spins remaining.

44. The method of claim 43, wherein the game functions are multipliers and the total award is determined by multiplying the award by the cumulative game function in each spin.

45. The method of claim 43, wherein the steps (a) to (d) are provided to the player through a data network.

46. The method of claim 45, wherein the data network is an internet.

* * * * *

UNITED STATES PATENT AND TRADEMARK OFFICE

CERTIFICATE OF CORRECTION

PATENT NO. : 7,121,942 B2
APPLICATION NO. : 10/243052
DATED : October 17, 2006
INVENTOR(S) : Anthony J. Baerlocher It is certified that error appears in the above-identified patent and that said Letters Patent is hereby corrected as shown below:

In Claim 25, column 15, line 60, change " (e) " to -- (f) -- .

In Claim 43, column 18, line 7, change "picked selections" to --picked selections, --.

Signed and Sealed this

Twelfth Day of June, 2007

JON W. DUDAS

*Director of the United States Patent and Trademark Office*